United States Patent Office 3,783,137
Patented Jan. 1, 1974

3,783,137
PROCESS FOR THE PREPARATION OF HETERO-
CYCLIC POLYMERS FROM AROMATIC TETRA-
MINES AND DERIVATIVES OF POLYCARBOX-
YLIC ACIDS
Arthur H. Gerber, University Heights, Ohio, assignor to
Horizons Incorporated, a division of Horizons Research
Incorporated
No Drawing. Filed June 9, 1971, Ser. No. 151,603
Int. Cl. C08g 33/02
U.S. Cl. 260—47 CP                    15 Claims

ABSTRACT OF THE DISCLOSURE

A process for the preparation of soluble heterocyclic polymers which comprises the reaction of an acid derivative of a di-, tri-, or tetra-basic acid with an aromatic tetramine acid salt in an aprotic polar solvent under mild reaction conditions, the acid derivative being added to the tetramine salt.

---

This invention relates to novel, useful, tractable polymeric compositions which can be converted into substantially intractable forms with outstanding physical and chemical properties, useful as films, fibers, coatings, adhesives, composites or laminates, foams, and many specialized end items.

A principal object of this invention is to provide a novel process for the preparation of soluble, essentially uncyclized heterocyclic polymers and their acid salts represented by the general Formulae I, II, III and IV below:

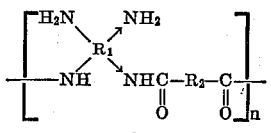

I

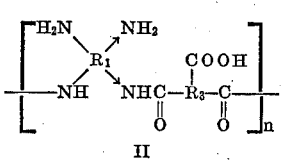

II

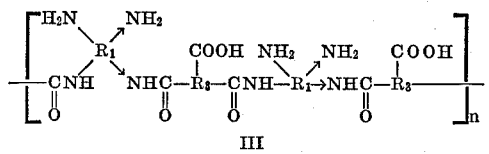

III

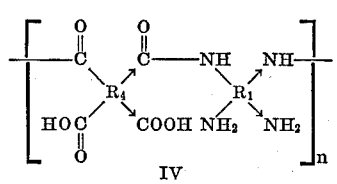

IV where $R_1$ represents a tetravalent aromatic organic radical wherein the amine or amide substituents are present as bis-o-pairs with no three amine or amide substituents being substituted in consecutive, adjacent positions on the ring; $R_2$ is a divalent organic radical or an inorganic radical containing at least one atom selected from the group consisting of phosphorus, nitrogen, boron, silicon, and oxygen; $R_3$ is a trivalent organic radical containing at least two carbon atoms, substituted with two carbon atoms being situated 1,2 or 1,3 on carbons of the $R_3$ group, and ortho or peri when $R_3$ is aromatic, the third carbon substituent not being in a 1,2 or 1,3 or ortho or peri position of either of the other two carbon substituents, the bond to this third carbon substituent being designated in Formulae II and III by a heavy line; $R_4$ is a tetravalent radical containing at least two carbon atoms, substituted with carbon atoms in pairs, the members of each pair being situated 1,2 or 1,3 on carbon atoms of the $R_4$ group, and ortho or peri when $R_4$ is aromatic; the symbol → denoting possible isomerism; and $n$ is an integer greater than unity. In the above formulae all of the $R_1$'s need not be identical, nor need the $R_2$'s, $R_3$'s, or $R_4$'s be identical. Polymers having the structures of Formulae I, II, III and IV can be converted from soluble, tractable, essentially uncyclized polymers to substantially intractable, cyclized polymers of Formulae V, VI, VII and VIII, respectively:

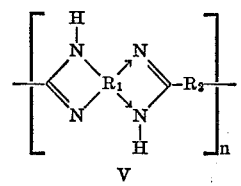

V

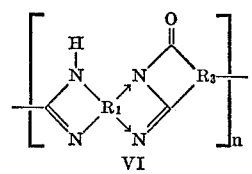

VI

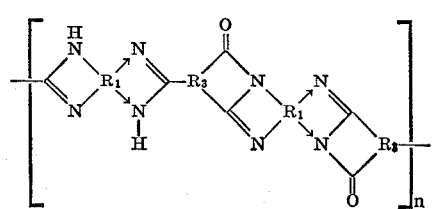

VII

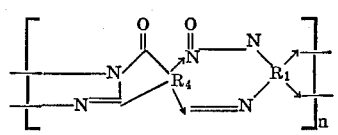

VIII wherein $R_1$, $R_2$, $R_3$, $R-$, and $n$ have the same meanings as in Formulae I, II, III and IV.

A further object is to provide for the production of polymers with excellent color and ordered structure.

Another object is to provide a simple means of preparing substantially uncyclized polymers of mixed polymer structures which are either white or only slightly colored.

Still other objects are to provide means for preparing high purity tetramine acid salts directly from nitro precursors and to utilize said salts in the preparation of the soluble, uncyclized polymers described above.

The advantages of the present invention will be better understood upon examination of the presently practiced methods of producing polybenzimidazole-type compositions. These methods all possess one or more serious drawbacks, particularly for the preparation of uniform products on a large production scale. These methods, which are summarized in H. Levine's review article on polyimidazoles in the Encyclopedia of Science and Technology, vol. II, p. 188 (Interscience, New York, 1969), are as follows:

(1) Polycondensation of an aromatic tetramine with a dibasic acid or acid derivative in polyphosphoric acid,
(2) Solid state, thermal polymerization of the aromatic tetramine with the diphenyl ester of a dibasic acid, and (3) Reaction of a dibasic acid derivative, such as the diamide, with the aromatic tetramine to a low conversion and subsequently heating the mixture of monomers and oligomers.

The first of these involves high temperatures (generally 150–200° C.), and does not lend itself readily to the formation of films, coatings, etc. because of the polyphosphoric acid solvent. In the second method completely volatilizing off the phenol produced has been found to be difficult. The second and third methods, in addition to requiring temperatures in excess of 200° C., require the use of the free tetramine base which in many instances [specially 1,2,4,5-tetraaminobenzene and bis(3,4-diaminophenyl) ether] is extremely difficult to obtain pure and is easily oxidized to colored matter with attendant loss of stoichiometry and desired polymer structure.

Other methods reported in the literature have utilized the methyl ester or diacid halide of a dibasic acid with the tetramine free base, but both acid reagents have been found unsatisfactory because of partial methylation of the amine and frequent gelation, respectively.

A recent publication [C. S. Marvel et al., Journal of Polymer Science, part A-1, 8, 3177 (1970)] describes the polybenzimidazoles derived from 1,2,5,6-tetraaminoanthaquinone and iso- and terephthaloyl chlorides. Refluxing nitrobenzene (about 210° C.) is used and the polymer precipitates out upon cooling. Marvel (ibid., p. 3189) also describes the reaction of aromatic dialdehyde bisulfite adducts with 1,2,5,6-tetraaminoanthraquinone at the boiling point of N,N-dimethylacetamide.

In all of the above methods substantially cyclized polymer is produced which possesses limited utility in forming films and other useful shaped forms.

It has now been found that diacid halides, preferably chlorides, can be used successfully to prepare soluble, substantially uncyclized heterocyclic polymers, commonly called prepolymers, thereby circumventing the gelation problem while still producing high molecular weight polymer. The uncyclized polymer can, by presently known techniques, be converted to useful polybenzimidazoles and partial polybenzimidazoles. This can be accomplished despite great differences in basicity of the various tetramine free bases that are suitable for this invention.

The essentials of the polymer forming process involve gradually adding a substantially equimolar amount of the acid halide derivative to a stirred solution, or partial solution, of the acid salt of an aromatic tetramine. In cases of partial solution, the addition of acid halide is made in such a way that as the reaction proceeds more of the salt dissolves and the solution concentration of salt is at least equal to, or preferably greater than, the concentration of acid halide.

Polar aprotic solvents are preferred for this polymerization process. Suitable solvents include N,N-dimethylformamide, N,N-dimethylacetamide, N-methylpyrollidinone, hexamethylphosphoramide, and N-methylcaprolactam. These solvents may be used singly or in combination with one another or in combination with other aprotic solvents. The solvent used should be reasonably anhydrous and preferably deoxygenated when used with extremely air-sensitive amines and must be at least partly solvent for the tetramine acid salt and must not react, other than by neutralization of acid formed, with either reactant under the conditions of the polymerization.

Reaction temperatures that have been found suitable vary from below about 0° upward to about 75° C., with temperatures in the range 5–40° C. generally being preferred. It is sometimes desirable to increase the reaction temperature in the final stages of polymerization.

Suitable tetramine salt that may be used for the process of this invention are derived from the following tetramines; but are not restricted to those listed:

1,2,4,5-benzenetetramine
2,3,5,6-tetraaminotoluene
2,3,5,6-tetraamino-p-xylene
3,4,3',4'-tetraaminobiphenyl
2,3,3'-4'-tetraaminobiphenyl
3,4,3',4'-tetraamino-5,5'-dichlorobiphenyl
2,3,6,7-tetraamino-9-fluoroenone
2,3,7,8-tetraaminodibenzofuran
2,3,6,7-naphthalenetetraamine and other amines represented by one of the following general formulae including their nuclear substituted deratives:

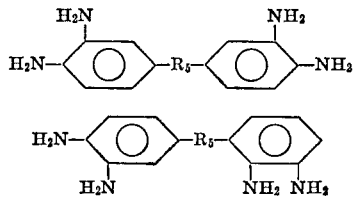

in which $R_5$ represents a divalent radical selected from the group consisting of methylene, ethylene, isopropylidene, oxygen, carbonyl, sulfur, and sulfone.

The amine salt can either be preformed or formed in situ. Acids suitable for this purpose include hydrogen chloride, hydrogen bromide, trifluoroacetic acid, lower alkanesulfonic acids (such as methane- and ethanesulfonic acids), perfluoroalkanesulfonic acids, and benzenesulfonic acid, but are by no means restricted to these strong acids. The choice of acid salt is important since it in part influences the solubility and reactivity of the tetramine reactant. The trifluoroacetate and sulfonate salts are generally more soluble than the hydrochloride salts. For example, 1,2,4,5-tetraaminobenzene tetrahydrochloride is quite insoluble and difficult to convert to a soluble heterocyclic polymer upon reaction with an aromatic dibasic acid chloride. However its tetrakis(methanesulfonate) salt, which can easily be obtained as a white solid in high purity, is very soluble in the preferred solvents and is converted to soluble polymers of the desired structure. With tetramines such as 3,3',4,4'-tetraaminobenzophenone and bis(3,4-diaminophenyl)sulfone, which are quite stable to oxidation at room temperature, it is not necessary to preform the acid salt since the stoichiometric amount of acid may be added before or after solution of the tetramine, but prior to the addition of acid halide reactant.

It is often desirable to add more acid than is necessary to protonate each amine site of the tetramine reactant. This can be advantageous in either further solubilizing the tetramine or in decreasing its reactivity, leading to a more controlled polymerization reaction. For example, the addition of methanesulfonic acid in small quantity to a salt derived from one of the more basic tetramines suitable for this invention often achieves this purpose. The acid added need not be the same as that present originally in the tetramine salt. Since the tetramine acid salts can be easily obtained as high purity, whitish solids, the resulting polymers display excellent color not normally obtained when the tetramine free base is utilized. This is particularly important when very air-sensitive tetramines such as 1,2,4,5-tetraaminobenzene and bis(3,4-diaminophenyl) ether are employed.

The acidity of the acid present in the tetramine salt has been found, quite unexpectedly, to be extremely important. When the tetrakis(methanesulfonate) salt of 3,3'-diaminobenzidine is prepared in situ and subsequently reacted with pyromellitic dianhydride gelation is not a problem and light-colored, soluble prepolymer is easily isolated. Furthermore, by use of the extremely strong acid trifluoromethanesulfonic acid, the above polycondensation can also be successfully accomplished simply by addition of two equivalents of trifluoromethanesulfonic acid to 3,3'-diaminobenzidine tetrahydrochloride prior to addition of dianhydride. The bis(trifluoromethanesulfonate) dihydrochloride is thus formed in situ.

Actually by using the bis(trifluoromethanesulfonate) salts of tetramines, soluble prepolymers may be prepared using the various acid derivatives described in this specification. The tetrakis(trifluoromethanesulfonate) salts are often too sluggish in reaction, and in such cases are not preferred reactants.

Furthermore, the use of methanesulfonic acid and trifluoromethanesulfonic acid salts often yields polymer solutions which are dilutable with low-boiling solvents, such as methanol. Such diluted solutions are useful in that they possess low viscosity thus making them ideally suited for coating applications.

When diacid halides are used as the acid reactant, essentially uncyclized polybenzimidazoles are produced. Suitable diacid halides which have been used include those derived from the following acids:

terephthalic acid
tetrafluoroterephthalic acid
isophthalic acid
2,6-naphthalenedicarboxylic acid
4,4'-biphenyldicarboxylic acid
bis(4-carboxyphenyl) ether
4,4'-benzophenonedicarboxylic acid
bis(4-carboxyphenyl) sulfone
2,5-furandicarboxylic acid
3,5-pyridinedicarboxylic acid
2,5-pyrazinedicarboxylic acid
2,7-anthraquinonedicarboxylic acid
1,1'-ferrocenedicarboxylic acid
1,4-cyclohexanedicarboxylic acid
perfluoroglutaric acid
bis(p-carboxyphenyl)methyl phosphine oxide
1,3-bis-(γ-carboxyphenyl-n-propyl)-1,1,3,3-tetramethyl disiloxane
2,5-bis-(m-carboxyphenyl)-1,3,4-oxadiazole.

Other diacid halides may be used, and mixtures of diacid halides may be used with proper regard to the proportion of amine salt.

When the monoacid halide anhydride of a tribasic acid is used as the acid reactant essentially uncyclized partial polybenzimidazoles may be produced. The process is essentially as described for the bis(acid halides) except that final temperatures of up to about 100° C. may be employed. Monoacid halide anhydrides suitable for the present invention include those derived from the following tribasic acids:

1,4,5-naphthalenetricarboxylic acid
2,3,6-naphthalenetricarboxylic acid
2,3,6-anthraquinonetricarboxylic acid
3,3',4-biphenyltricarboxylic acid
3,4-dicarboxyphenyl 4'-carboxyphenyl ether
3,4-dicarboxyphenyl 3'-carboxyphenyl sulfone
3,3',4-tricarboxybenzophenone
2,3,6-pyridinetricarboxylic acid
1,2,4-cyclohexanetricarboxylic acid.

Mixtures of anhydrides of these and other tricarboxylic acids may be used as the acid derivatives, or mixtures of the acid halides and acid anhydrides may be used in the process of this invention.

In essentially the same manner by using dianhydrides as the acid reactant, soluble linear amino polyamide acid structures (i.e., IV) may be prepared. Some representative dianhydrides that may be used are as follows:

pyromellitic dianhydride
2,3,6,7-naphthalenetetracarboxylic dianhydride
3,3',4,4'-diphenyltetracarboxylic dianhydride
1,2,5,6-naphthalenetetracarboxylic dianhydride
2,2',3,3'-diphenyltetracarboxylic dianhydride
2,2-bis(3,4-dicarboxyphenyl)propane dianhydride
bis(3,4-dicarboxyphenyl) sulfone dianhydride
3,4,9,10-perylenetetracarboxylic dianhydride
bis(3,4-dicarboxyphenyl) ether dianhydride
naphthalene-1,2,4,5-tetracarboxylic dianhydride
naphthalene-1,4,5,8-tetracarboxylic dianhydride
decahydronaphthalene-1,4,5,8-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
cyclopentane-1,2,3,4-tetracarboxylic dianhydride
pyrazine-2,3,5,6-tetracarboxylic dianhydride
2,2-bis(2,3-dicarboxyphenyl)propane dianhydride
1,1-bis(2,3-dicarboxyphenyl)ethane dianhydride
1,1-bis(3,4-dicarboxyphenyl)ethane dianhydride
bis(2,3-dicarboxyphenyl)methane dianhydride
bis(3,4-dicarboxyphenyl)methane dianhydride
benzene-1,2,3,4-tetracarboxylic dianhydride
thiophene-2,3,4,5-tetracarboxylic dianhydride
decahydronaphthalene-1,2,5,6-tetracarboxylic dianhydride
cyclohexane-1,2,4,5-tetracarboxylic dianhydride
3,3',4,4'-benzophenonetetracarboxylic dianhydride
pyridine-2,3,5,6-tetracarboxylic dianhydride
anthraquinone 2,3,5,6-tetracarboxylic dianhydride.

The order of addition of reactants and the stoichiometry have been found to be critical to the preparation of useful soluble polymers. That is, the acid halide reactant must be added to a substantially equimolar amount of the tetramine salt. If this order of addition is reversed the production of gelled polymer will be favored. The use of tetramine acid salt instead of tetramine free base is also necessary in preventing formation of gelled polymer. This is illustrated by the addition of isophthaloyl chloride, a typical diacid chloride for this invention, to either a solution of 3,3'-diaminobenzidine or 3,3',4,4'-tetraaminobenzophenone resulting in the formation of gelled polymer. On the other hand, if the tetrahydrochloride salt of the diaminobenzidine or the trihydrochloride salt of the benzophenonetetramine is used, soluble heterocyclic polymers result. The criticality of the solubility of the tetramine salt and the rate of addition of the acid halide derivative is shown by the fact that in the reaction of 3,3'-diaminobenzidine tetrahydrochloride and isophthaloyl chloride gelled polymer is formed if the chloride is added too quickly or when an insufficient amount of the salt is in solution.

An unobvious advantage of employing the acid salts of tetramines is that soluble prepolymers can be prepared from dianhydrides derived from aromatic or heterocyclic tetracarboxylic acids in which the four carboxyl groups are oriented as two sets of peri-oriented groups such as 1,4,5,8-naphthalenetetracarboxylic acid. For example, essentially cyclized polymers showing outstanding thermal properties but extremely poor processability have previously been obtained from this tetraacid and tetramine free bases such as 1,2,4,5-benzenetetramine and 3,3'-diaminobenzidine. The corresponding essentially uncyclized, soluble prepolymers can not be prepared, except with great difficulty, from the tetramine free base. In contrast, by the practice of the present invention the preparation of such prepolymers is readily achieved. Such prepolymers can be easily processed into polymers with excellent properties.

Although the production of high molecular weight polymer requires high purity reactants in substantially equimolar proportions, more than one acid reactant and/or tetramine salt may be present providing that the stoichiometry is retained. That is, the total moles of acid derivative(s) must substantially equal the total moles of tetramine salt(s). One advantage of producing such mixed polymers is that mixed polymers may possess unexpected useful improvements in solubility, flexibility, and hence, processability not shown by either homopolymer.

By increasing the mole ratio of tetramine salt(s) to acid derivative(s) to greater than unity, amine-terminated prepolymers of lower molecular weight may be obtained. The resulting polymers can then be used as reactants for the preparation of high molecular polymers which may contain monomer residues other than those present in the original polymerization.

The tractable polymers produced by this invention can be easily isolated with or without acid. When the polymerization is complete, addition of non-solvent, such as methanol, isopropyl alcohol, tetrahydrofuran, acetone, methylene chloride, etc., may be added to precipitate the uncyclized polymer which is partly neutralized by the acid originally present. Polymer free of acid originally present may be obtained by neutralizing the acid with a base such as an organic amine (e.g., triethylamine) prior to precipitation of polymer, or by neutralizing the acid-containing dry solid, or by wet spinning the polymer solution into an aqueous system containing sufficient base to neutralize the strong acid.

Conversion of the uncyclized polymers produced as described above to the essentially cyclized, less tractable polymers for ultimate use as high performance materials may be accomplished by methods including heating the polymer in solution or as a relatively dry solid (with or without volatile acid) at temperatures in excess of 150° C. under vacuum or in an inert atmosphere or in a polyphosphoric acid solution. In cases where neutralization of the uncyclized polymer is not contemplated, it is preferable to use the tetramine as the hydrochloride, hydrobromide or trifluoroacetate salt since these acids are easily volatilized in the formation of the desired cyclized polymer by heating. Since the original polymerization process produces polymers of very light color, the final thermally cyclized counterparts also display desirable light color. This is particularly advantageous in certain applications, for example, coatings.

Since some tetramines, particularly 1,2,4,5-tetraaminobenzene and bis(3,4-diaminophenyl) ether, are extremely air sensitive it is highly desirable to be able to prepare their acid salts directly from the nitro or nitroso precursors rather than to prepare the tetramine free base by conventional reduction methods and then convert to the acid salt. In so doing, direct isolation of the relatively oxidation-resistant, stable tetramine salt greatly reduces color before or during polymerization and preserves amine stoichiometry so that polymer with optimum chemical and physical properties may be obtained.

It has been found that catalytic reduction of the nitro or nitroso precursor of the amine can be carried out under mild conditions using particular acidic solvent systems. These solvents comprise a strong inorganic acid or lower alkanesulfonic acid (including perfluoroalkanesulfonic acids) generally with a cosolvent such as water, lower alkanols (including alkoxy and polyfluoro alkanols), or lower carboxylic acids. For example, phosphoric acid with or without acetic acid or methanol, sulfuric acid, methanesulfonic acid, or hydrogen bromide in acetic acid are all suitable. Where very strong acids such as trifluoromethanesulfonic acid are used, lower concentrations, often equivalent to the number of final amine groups, may be employed. The catalyst that is generally preferred is a platinum or palladium catalyst either as the free metal or as the oxide and may be on a support such as charcoal or barium sulfate. The amount of catalyst may vary greatly depending upon solvent and reaction temperatures, but is generally in the range of 0.5 to 10% by weight based on the diaminodinitro aromatic compound, the preferred range being 1-5%. Although diaminodinitroaromatics can be readily prepared and are preferred, other intermediates containing nitrogen in groups other than nitro or amine such as nitroso and hydroxylamino may also be reduced.

When acidic solvents are so used, the tetramine acid salt can be isolated conveniently either admixed with catalyst or as a solution which can then be precipitated by addition of the appropriate acid and/or nonsolvent. The hydrobromide, trifluoroacetate and alkanesulfonate salts are often desirable for polymerization reactions because of their greater solubility relative to the corresponding hydrochloride salts.

Furthermore, the hydrochloride salt can be used to prepare other acid salts. For example, a hydrochloride salt can be dissolved in methanesulfonic acid and the hydrogen chloride expelled from the resulting solution by heating. The methanesulfonate salt is then recovered by addition of nonsolvent to the solution. For the reduction, reaction temperatures can vary from 20 to 100° C. and initial hydrogen pressures of 30–1000 p.s.i. can be used. Temperatures of 35–75° C. and hydrogen pressures of 50–200 p.s.i. are preferred.

Since the color and purity of the tetramino aromatic compound are often extremely important, particularly in polymer-forming applications, the described catalytic method of reduction in acidic media is advantageous in that high purity, light colored (white to off-white) acid salt of the tetramine can be directly obtained in good yield.

In summary, the present invention provides a simple synthesis for the preparation of useful soluble, essentially uncyclized heterocyclic polymers and their acid salts. It also provides a simple method of preparing monomeric tetramine acid salts directly from nitro precursors. The polymerization reaction process involves a reaction of the acid salt of a tetramine with a substantially equimolar amount of acid halide and/or anhydride derivative of a polycarboxylic acid and is carried out at mild temperatures in an organic solvent. These processes are characterized by the production of essentially gel-free products and do not exhibit the sensitivity to gelation experienced in similar processes using tetramine free bases. When the polycarboxylic is a di- or tribasic acid, novel products are obtained in high purity and good color. When the polycarboxylic acid is a tetrabasic acid, known polymers result which are purer and of better color than when the methods of prior art are followed. In each instance a superior color and improved polymer structure results from a more controlled reaction which is due to the use of the relatively oxidation-resistant amine salt, instead of the use of the oxidation-sensitive free base used in the prior art. The acid salts of the polymers so produced can be used directly to form polymers in various useful shapes, particularly when the amine salt is derived from a volatile acid. This represents another improvement over prior art wherein a base, such as a tertiary amine, is used to neutralize the acid salt of tetramine prior to polycondensation thus forming a non-volatile component which must be washed out, etc. prior to polymer processing.

Related subject matter is disclosed in patent application entitled "Preparation of Heterocyclic Polymers From Heteroaromatic Tetramines" filed concurrently herewith.

The following examples are illustrative of preferred embodiments of this invention and are not to be construed as limiting the invention in any way.

EXAMPLE 1

Preparation of 1,2,4,5-benzenetetramine acid salts (A) Bis(trifluoromethanesulfonate).—A 250 cc. Parr bottle was charged with 50 cc. acetic acid containing 3.0 g. (0.02 mole) trifluoromethanesulfonic acid, 1.98 g. (0.01 mol) 1,3 - diamino - 4,6 - dinitrobenzene and 0.2 g. 5% palladium on charcoal and subjected to hydrogenation. An initial hydrogen pressure of 67 p.s.i.g. was used with a reaction temperature of 25–35° C. When the hydrogen uptake (4.0 p.s.i.) ceased the reaction was cooled, filtered free of catalyst, and ether added under nitrogen sweep to the filtrate to precipitate amine salt. The salt was filtered, washed and vacuum dried to yield 3.0 g.

off-white 1,2,4,5 - tetraaminobenzene bis(trifluoromethanesulfonate).

Calculated for $C_8H_{12}F_3N_4S_2O_6$ (percent): C, 21.9; H, 2.7; S, 14.6. Found (percent): C, 22.3; H, 2.6; S, 14.7.

(B) Tetramethanesulfonate.—A 500 cc. Parr bottle was charged with 40 cc. methanesulfonic acid, 60 cc. methanol, 5.94 g. (0.03 mole) 1,3- - diamino - 4,6 - dinitrobenzene and 0.6 g. 5% palladium on charcoal. The reduction was carried out at 30–40° C. with an initial hydrogen pressure of 90 p.s.i.g. When complete the reaction was allowed to cool to room temperature and then filtered free of catalyst. The clear filtrate was concentrated under reduced pressure and product precipitated by gradual addition, with stirring, of 100 cc. acetic acid. The mixture was cooled to 5° C., filtered, solid washed with acetic acid and acetic acid/isopropyl alcohol and vacuum dried to afford 1,2,4,5 - tetraaminobenzene tetramethanesulfonate in good yield as an off-white solid.

Calculated from $C_6H_{10}N_4 \cdot 4CH_4SO_3$ (percent): N, 10.7; S, 24.5. Found (percent): N, 10.4; S, 24.4.

The tetramethanesulfonate salt was also obtained by dissolving 6.0 g. (0.021 mole) 1,2,4,5-tetraaminobenzene tetrahydrochloride in 51 g. methanesulfonic acid, stirring overnight at 50° C. under nitrogen sweep and working up the solution as above. As essentially quantitative yield (11.0 g.) of amine salt was obtained.

EXAMPLE 2

Bis(3,4-diaminophenyl) ether acid salts

The reduction was carried out at 40–55° C. with an initial hydrogen pressure of 85 p.s.i.g. using the following quantities: 5 g. 4,4' - diamino - 3,3' - dinitrodiphenyl ether, 30 cc. 85% phosphoric acid, 70 cc. methanol and 0.7 g. 5% palladium on charcoal. When the reduction was complete (8.8 p.s.i. uptake), the reaction was cooled to room temperature, 20 cc. phosphoric acid added with good agitation and catalyst filtered off. To the amber filtrate was added an equal volume of concentrated hydrochloric acid and three times the volume of 10% hydrogen chloride in isopropyl alcohol. The mixture was stirred with cooling, solid filtered off, washed and vacuum dried to afford 3,3',4,4' - tetraaminodiphenyl ether tetrahydrochloride as a whitish solid in good yield.

Calculated for $C_{12}H_{14}N_4O \cdot 4HCl$ (percent): N, 14.9; Cl, 37.8. Found (percent): N, 14.7; Cl, 37.8.

The above product may also be obtained by substituting a 3% platinum on charcoal catalyst for the palladium catalyst or by replacing the methanol with 2-methoxyethanol or 2,2,2-trifluoroethanol.

The tetramethanesulfonate salt may be obtained from the tetrahydrochloride salt in a manner similar to that described in Example 1(B) or from the above reduction in phosphoric acid-methanol as follows: methanesulfonic acid (15 cc.) is added to the reduction mixture with good agitation and catalyst filtered off. The methanol is largely removed under reduced pressure and methanesulfonate salt is precipitated by addition of cold tetrahydrofuran.

In somewhat similar fashion the tetrahydrochloride, tetrahydrobromide, and tetramethanesulfonate salts of 3,3'-diaminobenzidine and 2,2 - bis(3,4 - diaminophenyl)-propane were prepared from 4,4' - diamino - 3,3' - dinitrodiphenyl and 2,2-bis(4 - amino - 3 - nitrophenyl) propane, respectively.

EXAMPLE 3

Polybenzimidazole prepolymer from 3,3'-diaminobenzidine acid salt and isophthaloyl chloride (A) Tetrahydrochloride salt.—Under an inert atmosphere a solution of 3.05 g. (0.015 mole) isophthaloyl chloride in 6 g. N-methylpyrrolidinone was gradually added to a stirred room temperature solution of 5.43 g. (0.015 mole) 3,3'-diaminobenzidine tetrahydrochloride in 45 g. deaerated anhydrous N-methylpyrrolidinone. The reaction was allowed to stir overnight and polymer precipitated by addition of methanol. The precipitate was stirred well, filtered, washed, and vacuum dried to give 4.8 g. off-white solid which was soluble in N,N-dimethylacetamide and methanesulfonic acid.

Calculated for $C_{20}H_{16}N_4O_2 \cdot HCl$ (percent): C, 63.0; H, 4.5; Cl, 9.3. Found (percent): C, 59.6; H, 5.3; Cl, 10.1.

A soluble prepolymer acid salt was similarly obtained when the tetrahydrobromide salt was used instead of the tetrahydrochloride salt.

When the tetrahydrochloride salt polymerization was repeated using 25 g. less solvent or replacing the tetrahydrochloride salt by 3,3'-diaminobenzidine free base, gelled polymer was obtained. Gelled polymer also resulted when the tetrahydrochloride salt was added to a solution of isophthaloyl chloride in N-methylpyrrolidinone.

The hydrochloride prepolymer was also obtained in excellent yield when 0.08 mole anhydrous hydrogen chloride was bubbled into a solution of 0.01 mole 3,3'-diaminobenzidine in 32 g. N-methylpyrrolidinone followed by addition of a solution of 0.01 mole isophthaloyl chloride as described above.

A viscous solution of the hydrochloride prepolymer in N,N-dimethylacetamide was used to cast films which were dried under inert atmosphere at 150° C. and finally at 250–300° C. The heating caused evolution of hydrogen chloride and cyclization to the corresponding polybenzimidazole structure. A substantial decrease in the solubility of the resultant polymer was observed. In addition, the product was rendered resistant to solvent and chemical attack and is then useful as a polymeric film. Little weight loss was observed when the polymer was heated to at least 500° C.

Essentially the same cyclized polymer was obtained by dissolving 2 g. of the hydrochloride prepolymer in 100 g. of polyphosphoric acid and heating 10 hours at 180° C. The cyclized polymer was isolated by precipitation, neutralization, filtration, and drying.

(B) Bis(trifluoromethanesulfonate) salt.—A solution of 1.01 g. (0.005 mole) isophthaloyl chloride in 2 cc. N-methylpyrrolidinone was gradually added to a stirred ice-temperature solution of 2.58 g. (0.005 mole) 3,3'-diaminobenzidine bis(trifluoromethanesulfonate) salt in 15 g. N-methylpyrrolidinone. The amine salt was prepared by addition of 0.04 mole trifluoromethanesulfonic acid to a stirred solution of 0.02 mole 3,3'-diaminobenzidine in 50 cc. trifluoroethanol, followed by filtering, washing, and drying. The polymerization was allowed to stir overnight at room temperature and polymer was precipitated by addition of methanol. The precipitate was washed well and dried to afford 2.3 g. whitish solid which was very low in sulfur content (0.09%) but contained chlorine indicative of the hydrochloride salt of the benzimidazole prepolymer.

(C) Neutral prepolymer.—To a stirred solution of 3.8 g. hydrochloride prepolymer from Example 3(A) in 50 cc. dimethylsulfoxide was added N-methylmorpholine (0.01 mole). Polymer was precipitated by the gradual addition of methanol. The product was filtered, washed well, and dried to obtain 3.2 g. whitish neutral benzimidazole prepolymer.

Calculated for $C_{20}H_{16}N_4O_2$ (percent): C, 69.8; H, 4.7; N, 16.3. Found (percent): C, 69.0; H, 4.8; N, 16.1.

This polymer or its hydrochloride precursor could be cyclized to polybenzimidazole fiber as follows: A hot viscous solution of polymer in N-methylpyrrolidinone was dry spun into a nitrogen stream preheated to 250° C. Fibers were drawn at temperatures of at least 270° C. and then relaxed at about 320° C. The fibers so produced showed excellent resistance to solvents, aqueous acid or alkali, and good thermal stability in air at 400° C.

Fibers were also obtained by wet spinning the polymer from Example 3(A) which resulted from cyclization in polyphosphoric acid. A hot viscous solution of cyclized polymer in methanesulfonic acid was extruded from a syringe, fitted with an 18 gauge needle, into aqueous methanesulfonic acid. The resultant fiber was thoroughly washed with water, dilute sodium carbonate, again in water, and dried.

EXAMPLE 4

Polybenzimidazole prepolymer from 3,3',4,4'-tetraaminobenzophenone trihydrochloride and isophthaloyl chloride (A) Equimolar reactants.—A solution of 2.03 g. (0.01 mole) isophthaloyl chloride in 3 cc. N-methylpyrrolidinone was gradually added at ice temperature to a stirred solution of 3.54 g. (0.01 mole) 3,3',4,4'-tetraaminobenzophenone trihydrochloride in 40 cc. anhydrous N-methylpyrrolidinone. The trihydrochloride amine salt was prepared by dissolving 20 g. 3,3',4,4'-tetraaminobenzophenone in 50 cc. N-methylpyrrolidinone, adding with stirring 150 cc. concentrated hydrochloric acid, filtering, washing, and drying the solid precipitate. The polymerization was allowed to stir overnight at room temperature. Polymer was isolated as described in Example 3(A). The yield of yellow-orange solid was 3.2 g. Analysis was indicative of a benzimidazole prepolymer partially neutralized by hydrogen chloride.

Calculated for $C_{21}H_{16}N_4O_3 \cdot HCl$ (percent): C, 61.6; H, 4.2; Cl, 8.7. Found (percent): C, 62.5; H, 4.9; Cl, 5.8.

Films and fibers were prepared in a manner similar to that described in Example 3.

(B) Amine-terminated benzimidazole prepolymer.—The procedure of Example 4(A) was followed using 0.008 mole isophthaloyl chloride. The product, a soluble, amine-terminated hydrochloride benzimidazole prepolymer, could be used directly to form other heterocyclic prepolymers. For example, reaction could be effected with terephthaloyl chloride, trimellitic anhydride monoacid chloride, or 1,2,4,5-benzenetetracarboxylic acid dianhydride.

EXAMPLE 5

Polybenzimidazole prepolymer from 1,2,4,5-benzenetetraamine tetramethanesulfonate salt and isophthaloyl chloride Under an inert atmosphere a solution of 2.03 g. (0.01 mole) isophthaloyl chloride in 5 cc. N-methylpyrrolidinone was gradually added to a stirred solution of 5.22 g. (0.01 mole) 1,2,4,5-tetraaminobenzene tetramethanesulfonate in 40 g. anhydrous deaerated N-methylpyrrolidinone. The reaction was continued at room temperature for 10 hours and polymer isolated as described in Example 3(A). The product (2.88 g.) was a white solid, soluble in N,N-dimethylacetamide, which analyzed for the benzimidazole prepolymer methanesulfonate salt.

Calculated for $C_{14}H_{12}N_4O_2 \cdot CH_4SO_3$ (percent): C, 49.5; H, 4.4; N, 15.4; S, 8.8. Found (percent): C, 50.9; H, 4.6; N, 14.6; S, 5.1.

Solvent- and chemically-resistant films of the cyclized polybenzimidazole were prepared in a manner similar to that described in Example 3(A).

When the above experiment was repeated with the insoluble 1,2,4,5-tetraaminobenzene tetrahydrochloride salt, gelation resulted early in the polymerization. A similar result was obtained using the tetrahydrochloride salt when 0.03 mole methanesulfonic acid was added prior to addition of isophthaloyl chloride.

EXAMPLES 6–12

When the procedures of Examples 3(A) and 3(C) were repeated using the diacid chloride of each of the following dibasic acids instead of isophthaloyl chloride, the corresponding polybenzimidazole prepolymers and cyclized polymers and films of good solvent and chemical resistance were obtained.

(6) terephthalic acid
(7) 4,4'-biphenyldicarboxylic acid
(8) 2,6-naphthalenedicarboxylic acid
(9) bis(4-carboxyphenyl) ether
(10) 4,4'-benzophenonedicarboxylic acid
(11) 2,5-pyrazinedicarboxylic acid
(12) terephthalic acid (0.0075 mole) and 4,4'-biphenyldicarboxylic acid (0.0075 mole).

EXAMPLES 13–17

When the procedures of Examples 3(A) and 3(C) were repeated using each of the following tetramine acid salts, instead of 3,3'-diaminobenzidine tetrahydrochloride, the corresponding polybenzimidazole prepolymers and cyclized polymers and films of good solvent and chemical resistance were obtained.

(13) bis(3,4-diaminophenyl) ether tetrahydrochloride
(14) bis(3,4-diaminophenyl) sulfone dihydrobromide
(15) 2,2 - bis(3,4 - diaminophenyl)propane tetramethanesulfonate
(16) 2,3,6,7-tetraaminonaphthalene bis(trifluoromethanesulfonate)
(17) bis(3,4-diaminophenyl) sulfone dihydrobromide (0.0075 mole) and 3,3',4,4'-tetraaminobenzophenone trihydrochloride (0.0075 mole).

EXAMPLE 18

Prepolymer from 3,3'-diaminobenzidine tetrahydrochloride and trimellitic anhydride chloride (A) Equimolar reactants.—Under an inert atmosphere a solution of 4.20 g. (0.02 mole) of trimellitic anhydride monoacid chloride in 12 cc. N,N-dimethylacetamide was added, with good stirring, to a solution of 7.24 g. (0.02 mole) 3,3'-diaminobenzidine tetrahydrochloride in 60 cc. anhydrous, deoxygenated N,N-dimethylacetamide. After stirring overnight at room temperature, the polymer was isolated by the procedure of Example 3(A). The polymer (7.5 g.) was a white solid which was soluble in dimethylsulfoxide and N,N-dimethylacetamide. Elemental analysis and infrared spectrum confirmed the structure as the partial hydrochloride salt of heterocyclic prepolymer. The neutralizer prepolymer was obtained following the procedure of Example 3(C).

Calculated for $C_{21}H_{15}N_4O_4$ (percent): C, 65.0; H, 3.9; N, 14.5. Found (percent): C, 64.0; H, 4.1; N, 13.8.

In somewhat similar fashion soluble heterocyclic prepolymer resulted when 3,3'-diaminobenzidine tetramethanesulfonate was used to replace the tetrahydrochloride salt.

Thermally stable, solvent-resistant films and fibers were prepared by essentially following the procedures of Examples 3(A) and 3(C).

Cyclized polymer was also obtained by heating a dilute solution of prepolymer in polyphosphoric acid at 180° C. for 15 hours.

(B) Amine-terminated polymer.—The procedure of Example 18(A) was followed using 0.016 mole trimellitic anhydride monoacid chloride. The product, a soluble, amine-terminated hydrochloride prepolymer, could be used directly to form other heterocyclic prepolymers. For example, reaction could be effected with the anhydride acid chloride of 3,3',4-tricarboxybenzophenone or 1,2,4,5-benzenetetracarboxylic acid dianhydride.

EXAMPLES 19–24

When the procedure of Example 18(A) was repeated replacing trimellitic anhydride acid chloride by the anhydried acid chloride derived from the following tribasic acids, the corresponding polyheterocycles and films of good solvent and chemical resistance were obtained.

(19) 1,4,5-naphthalenetricarboxylic acid
(20) 3,3',4-tricarboxybiphenyl
(21) 3,3',4-tricarboxybenzophenone
(22) 2,3,8-dibenzofurantricarboxylic acid
(23) 3,4-dicarboxyphenyl 3'-carboxyphenyl sulfone
(24) 3,3',4-tricarboxybiphenyl (0.01 mole) and trimellitic acid (0.01 mole).

EXAMPLES 25-28

When the procedure of Example 18(A) was repeated using each of the following tetramine acid salts instead of 3,3'-diaminobenzidine tetrahydrochloride, the corresponding polyheterocycles and films of good solvent and chemical resistance were obtained.

(25) 1,2,4,5-benzenetetramine tetramethanesulfonate
(26) 3,3',4,4'-tetraaminobenzophenone trihydrochloride
(27) bis(3,4-diaminophenyl) ether tetrahydrochloride
(28) 3,3',4'4' - tetraaminobenzophenone trihydrochloride (0.01 mole) and bis(3,4-diaminophenyl) sulfone dihydrobromide (0.01 mole).

EXAMPLE 29

Prepolymer from 3,3'-diaminobenzidine acid salt and pyromellitic dianhydride (A) Tetrahydrochloride salt.—3,3' - diaminobenzidine tetrahydrochloride was prepared in situ by bubbling 2.4 g. anhydrous hydrogen chloride into a solution of 2.16 g. (0.010 mole) 3,3'-diaminobenzidine in 30 g. anhydrous, deoxygenated N-methylpyrrolidinone. To this solution at room temperature was gradually added, with good stirring, 2.14 g. (0.0098 mole) pyromellitic dianhydride. After 8 hours at room temperature a very viscous homogeneous solution resulted. After stirring overnight at room temperature, the polymer was isolated as described in Example 3(A). Elemental analysis and infrared spectrum confirmed the structure as the partial hydrochloride salt of the amino polyamide acid prepolymer. The hydrochloride-free polymer was obtained by exactly neutralizing the hydrogen chloride with triethylamine. Films and fibers with outstanding chemical and thermal properties could be obtained from the neutral or hydrochloride prepolymer in a manner similar to that described in Examples 3(A) and 3(C).

When the above procedure was repeated using 2% excess dianhydride, gelation resulted even when 0.02 mole methanesulfonic acid was present.

(B) Tetramethanesulfonate salt.—3,3' - diaminobenzidine tetramethanesulfonate was prepared in situ by adding 4.1 g. (0.043 mole) methanesulfonic acid to a solution of 2.16 g. (0.01 mole) 3,3'-diaminobenzidine in 31 g. anhydrous, deoxygenated N-methylpyrrolidinone. To this solution at room temperature was grandually added, with good stirring, 2.18 g. (0.01 mole) pyromellitic dianhydride. The polymer was worked up as above after stirring 10 hours at room temperature to obtain 5.0 g. whitish solid. This product was the methanesulfonate salt of the amino polyamide acid prepolymer prepared above.

EXAMPLE 30

Prepolymer from 3,3' - diaminobenzidine tetramethanesulfonate and 1,4,5,8 - naphthalenetetracarboxylic acid dianhydride (A) Equimolar reactants.—Under an inert atmosphere 2.68 g. (0.01 mole) 1,4,5,8 - naphthalenetetracarboxylic acid dianhydride was added to a stirred solution of 6.00 g. (0.01 mole) 3,3' - diaminobenzidine tetramethanesulfonate in 30 g. anhydrous, deoxygenated hexamethylphosphoramide. The reaction was gradually raised to 52° C., stirred 1 day at this temperature and 2 days at 40° C. Polymer was isolated by precipitation with methanol, thorough washing, and drying. The light brown solid (4.0 g.) was soluble in dimethylsulfoxide and N-methylpyrrolidinone and was shown by analysis to be a methanesulfonate salt of the amino polyamide acid prepolymer.

Calculated for $C_{26}H_{18}N_4O_6 \cdot CH_4SO_3$ (percent): C, 56.2; H, 3.8; S, 5.6; O, 25.0. Found (percent): C, 53.8; H, 3.7; S, 5.9; O, 26.8.

When the methanesulfonic acid in the above product was exactly neutralized with triethylamine, the resulting polymer could be used to produce films and fibers with excellent chemical and thermal properties.

(B) Amine - terminated prepolymer.—When the procedure of Example 30(A) was repeated with 0.008 mole 1,4,5,8 - naphthalenetetracarboxylic acid dianhydride the methanesulfonate salt of the amine-terminated prepolymer resulted. This prepolymer could be used to form other heterocyclic polymers. For example, reaction could be effected with pyromellitic dianhydride.

EXAMPLES 31-36

When the procedure of Example 29(B) was repeated using each of the following dianhydrides instead of 1,2,4,5-benzenetetracarboxylic acid dianhydride, the corresponding polyheterocycles were obtained.

(31) 2,3,6,7-naphthalenetetracarboxylic acid dianhydride
(32) 3,3',4,4'-diphenyltetracarboxylic acid dianhydride
(33) 3,3',4,4' - benzophenone tetracarboxylic acid dianhydride
(34) bis(3,4-dicarboxyphenyl)methane dianhydride
(35) pyrazine-2,3,5,6-tetracarboxylic acid dianhydride
(36) 3,3',4,4' - diphenyltetracarboxylic acid dianhydride (0.005 mole) and 3,3',4,4'-benzophenone tetracarboxylic acid dianhydride (0.005 mole).

EXAMPLES 37-40

When the procedure of Example 29(B) was repeated using each of the following tetramine acid salts instead of 3,3'-diaminobenzidine tetramethanesulfonate, the corresponding polyheterocycles were obtained.

(37) 1,2,4,5-benzenetetraamine tetramethanesulfonate
(38) 3,3',4,4'-tetraaminobenzophenone trihydrochloride
(39) bis(3,4-diaminophenyl) ether tetrahydrochloride
(40) 3,3',4,4'-tetraaminobenzophenone trihydrochloride (0.005 mole) and bis(3,4-diaminophenyl) sulfone dihydrobromide (0.005 mole).

EXAMPLE 41

Polymers from 3,3'-diaminobenzidine tetramethanesulfonate, isophthaloyl chloride, and trimellitic anhydride chloride Under an inert atmosphere, a solution of 2.03 g. (0.01 mole) isophthaloyl chloride in 5 cc. N-methylpyrrolidinone was added, with good stirring, to a solution of 12.0 g. (0.02 mole) 3,3'-diaminobenzidine tetramethanesulfonate in 40 g. anhydrous, deoxygenated N-methylpyrrolidinone at 5° C. After 2 hours at ice temperature, a solution of 2.10 g. (0.01 mole) of trimellitic anhydride monoacid chloride in 6 cc. N-methylpyrrolidinone was gradually added to the polymerization reaction. The reaction was allowed to warm up to room temperature, stirred 15 hours, and 50 cc. N,N-dimethylacetamide added. The methanesulfonic acid and hydrogen chloride were neutralized with N-methylmorpholine and polymer (7.0 g.) isolated by precipitating with methanol, thoroughly washing, and drying. The polymer was soluble in N,N-dimethylacetamide and methanesulfonic acid.

Calculated for $C_{41}H_{32}N_8O_6$ (percent): C, 67.2; H, 4.4; N, 15.3. Found (percent): C, 66.2; H, 4.5; N, 14.8.

In the above experiment, if neutralization with N-methylmorpholine was omitted, the acid salt of the uncyclized prepolymer was isolated.

Cyclodehydration of the above polymer was readily accomplished by heating in dilute polyphosphoric acid solution 15 hours at 180° C. or by heating at 250-350° C. under reduced pressure. The resulting cyclized polymer exhibited excellent solvent and thermal resistance. Films and fibers of similar resistance were prepared following the procedures of Examples 3(A) and 3(C).

EXAMPLE 42

Polymers from 1,2,4,5-benzenetetramine tetramethanesulfonate, isophthaloyl chloride, and pyromellitic dianhydride The procedure of Example 41 was essentially repeated using 0.02 mole 1,2,4,5-benzenetetramine tetramethanesulfonate to replace the 3,3'-diaminobenzidine tetramethanesulfonate and 0.01 mole pyromellitic dianhydride to replace the trimellitic anhydride monoacid chloride. The neutralized polymer (5.9 g.) produced was soluble in N,N-dimethylacetamide and methanesulfonic acid. Both the neutralized prepolymer and its partial acid salt were converted to the cyclized form by heating in dilute polyphosphoric acid at 180° C. for 15 hours or by heating at 250–350° C. under reduced pressure. The resulting cyclized polymer exhibited excellent solvent and thermal resistance. Films and fibers of the cyclized polymer showed similar resistance.

I claim:
1. A process for the preparation of soluble uncyclized polymer and the acid salts thereof which comprises:
  (1) reacting at least one acid salt of an aromatic tetramine represented by the formula $R_1(NH_2)_4$ in which $R_1$ represents a tetravalent aromatic radical and in which the amine substituents are present as bis-o-pairs with no three substituents substituted in consecutive, adjacent positions on the ring; with
  (2) at least one derivative of a polycarboxylic acid, said derivative being selected from the group consisting of dibasic acid halides, mono(acid halide) anhydrides of tricarboxylic acids, and mixtures thereof with at least one dianhydride of a tetracarboxylic acid;
  said reaction being effected at a temperature less than about 75° C. in an aprotic solvent in which the tetramine salt is at least partially soluble; the total moles of tetramine salt being at least equal to the total moles of said derivatives.
2. The process of claim 1 wherein the acid salts of the tetramines are salts of at least one acid selected from the group consisting of hydrogen chloride, hydrogen bromide, trifluoroacetic acid, lower alkanesulfonic acids, and perfluoroalkanesulfonic acids.
3. The process of claim 1 wherein the reactants include at least one dibasic acid halide as defined in said claim.
4. The process of claim 1 in which the total moles of tetramine salts is greater than the total moles of acid derivatives.
5. The products of claim 13 in which $R_1$ is at least one member selected from the group consisting of 1,2,4,5-tetrasubstituted benzene and 3,3',4,4'-tetrasubstituted diaryls represented by one of the structural formula

and

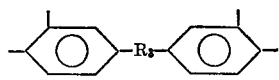

in which $R_3$ represents a divalent member selected from the group consisting of alkylidene of 1 to 3 carbon atoms, oxygen, carbonyl, sulfur, and sulfone.
6. The products of claim 13 in which the acid salt is selected from the group consisting of hydrochloride, hydrobromide, trifluoroacetate, lower alkanesulfonate, perfluoroalkanesulfonate, and mixtures of said acid salts.
7. The process of claim 1 wherein the reactants include at least one mono (acid halide) anhydride of a tricarboxylic acid.
8. The process of claim 1 in which the reactants include at least one dianhydride of a tetracarboxylic acid.
9. The products of claim 14 in which $R_1$ is at least one member selected from the group consisting of 1,2,4,5-tetrasubstituted benzene and 3,3',4,4'-tetrasubstituted diaryls represented by one of the structural formula

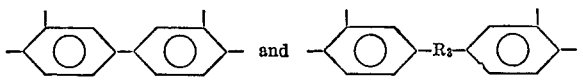

in which $R_3$ represents a divalent member selected from the group consisting of alkylidene of 1 to 3 carbon atoms, oxygen, carbonyl, sulfur, and sulfone.
10. The products of claim 14 in which $R_4$ is a 1,2,4-trisubstituted benzene.
11. The process of claim 1 in which the reaction is effected by adding the carboxylic acid derivative to the tetraamine salt.
12. The process of claim 1 in which the reaction is effected at a temperature in the range 5 to 40° C.
13. Soluble uncyclized polymer consisting essentially of units represented by the formula

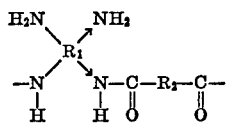

wherein $R_1$ is a tetravalent aromatic radical and in which the amine substituents are present as bis-o-pairs with no three substituents substituted in consecutive, adjacent positions on the ring; $R_2$ is a divalent organic radical and → represents possible isomerism; and the acid salts of said polymer.
14. Soluble uncyclized polymer consisting essentially of units represented by the formula

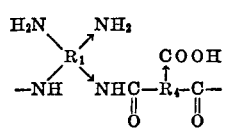

in which $R_1$ represents a tetravalent aromatic radical and in which the amine substituents are present as bis-o-pairs with no three substituents substituted in consecutive, adjacent positions on the ring; $R_4$ represents a trivalent radical containing at least two carbon atoms, substituted with two carbon atoms being situated 1,2 or 1,3 on carbons of the $R_4$ group and ortho or peri when $R_4$ is aromatic, the third carbon substituent not being in a 1,2 or 1,3 or ortho or peri position to either of the other two carbon substituents; and → represents possible isomerism; and the acid salts of said polymer.
15. Soluble uncyclized polymer consisting essentially of units represented by at least one of the formulae

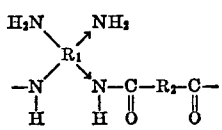

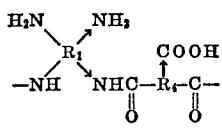

and mixtures of at least one of said units with units represented by the formula

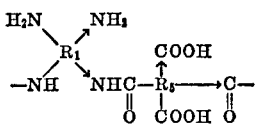

in which $R_1$ represents a tetravalent aromatic radical and in which the amine substituents are present as bis-o-pairs with no three substituents substituted in consecutive, adjacent positions on the ring; $R_2$ is a divalent organic radical; $R_4$ represents a trivalent radical containing at least two carbon atoms, substituted with two carbon atoms being situated 1,2 or 1,3 on carbons of the $R_4$ group and ortho or peri when $R_4$ is aromatic, the third carbon substituent not being in a 1,2 or 1,3 or ortho or peri position to either of the other two carbon substituents; wherein $R_5$ represents a tetravalent radical containing at least two carbon atoms, substituted with carbon atoms in pairs, the members of each pair being situated 1,2 or 1,3 on carbons of the $R_5$ group, and ortho or peri when $R_5$ is aromatic and the → represents possible isomerism; and the acid salts of said polymer.

References Cited
UNITED STATES PATENTS

| | | | |
|---|---|---|---|
| Re. 26,065 | 7/1966 | Marvel et al. | 260—47 |
| 3,313,783 | 4/1967 | Iwakura et al. | 260—78 |
| 3,386,969 | 6/1968 | Levine | 260—78.4 |
| 3,518,232 | 6/1970 | Bell, Jr. | 260—78 |

LESTER L. LEE, Primary Examiner

U.S. Cl. X.R.

117—161 P; 260—30.2, 30.8 DS, 32.6 N, 65, 78 TF